(12) United States Patent
Johansen (10) Patent No.: US 12,131,657 B2
(45) Date of Patent: Oct. 29, 2024

(54) COLLISION AVOIDANCE SYSTEM (71) Applicant: ASTRONICS AEROSAT CORPORATION, Manchester, NH (US)

(72) Inventor: Anthony Johansen, New Boston, NH (US)

(73) Assignee: ASTRONICS AEROSAT CORPORATION, Manchester, NH (US)

(*) Notice: Subject to any disclaimer, the term of this patent is extended or adjusted under 35 U.S.C. 154(b) by 0 days.

(21) Appl. No.: 17/943,718

(22) Filed: Sep. 13, 2022

(65) Prior Publication Data
US 2023/0086453 A1    Mar. 23, 2023

Related U.S. Application Data (60) Provisional application No. 63/245,368, filed on Sep. 17, 2021.

(51) Int. Cl.
| | | |
|---|---|---|
| *G08G 5/00* | (2006.01) | |
| *B64D 45/00* | (2006.01) | |
| *B64D 47/00* | (2006.01) | |
| *G08G 5/04* | (2006.01) | |

(52) U.S. Cl.
CPC .............. *G08G 5/04* (2013.01); *B64D 45/00* (2013.01); *B64D 47/00* (2013.01)

(58) Field of Classification Search
USPC ....... 340/945, 902, 903, 909, 929, 947, 948, 340/952–961, 963, 979–983, 994, 435, 340/525
See application file for complete search history.

(56) References Cited

U.S. PATENT DOCUMENTS

| | | | | |
|---|---|---|---|---|
| 6,275,172 B1* | 8/2001 | Curtis | ................. | G01C 23/00 340/961 |
| 7,387,026 B1* | 6/2008 | Gayle | ................. | G01N 29/11 73/592 |
| 8,629,800 B2 | 1/2014 | Anderson et al. | | |
| 9,091,762 B2 | 7/2015 | Knight | | |
| 10,050,336 B2 | 8/2018 | Wang et al. | | |
| 10,388,173 B2* | 8/2019 | Durand | ................. | G08G 5/045 |
| 2006/0066470 A1 | 3/2006 | Anderson et al. | | |
| 2008/0255714 A1* | 10/2008 | Ross | ................. | G01S 17/95 701/14 |
| 2012/0075461 A1* | 3/2012 | Yu | ................. | G08G 5/0026 348/E7.085 |

(Continued)

FOREIGN PATENT DOCUMENTS

WO    WO 2006/138387 A2    12/2006

*Primary Examiner* — Daniel Previl
(74) *Attorney, Agent, or Firm* — Pauley Erickson & Swanson (57) ABSTRACT

A collision avoidance system for aircraft. A light fixture assembly includes a housing with a base and a clear dome over the base. The base including an aircraft attachment element that allows for drop-in replacement of original light housings. An aircraft light is within the housing, as well as an ultrasonic sensor. The sensor is tied to a warning indicator configured to issue an alert when the light fixture approaches an obstacle. The installation provides a permanent replacement for wing lights or taillights, whereby the proximity sensors are always on the aircraft, and do not need to be added once landed.

17 Claims, 8 Drawing Sheets (56) References Cited

U.S. PATENT DOCUMENTS

| | | | |
|---|---|---|---|
| 2013/0332062 A1* | 12/2013 | Kreitmair-Steck | G01S 7/062 |
| | | | 701/301 |
| 2015/0206438 A1 | 7/2015 | Marsden et al. | |
| 2015/0206439 A1* | 7/2015 | Marsden | B64D 47/02 |
| | | | 701/301 |
| 2015/0269847 A1* | 9/2015 | Knight | B64D 47/08 |
| | | | 701/3 |
| 2019/0265732 A1* | 8/2019 | Arwatz | B64C 39/024 |
| 2021/0125410 A1* | 4/2021 | Da Silva | B64D 47/08 |

* cited by examiner

COLLISION AVOIDANCE SYSTEM

CROSS REFERENCE TO RELATED APPLICATION

This application claims the benefit of U.S. provisional patent application Ser. No. 63/245,368, filed on 17 Sep. 2021. The provisional application is hereby incorporated by reference herein in its entirety and is made a part hereof, including but not limited to those portions which specifically appear hereinafter.

BACKGROUND OF THE INVENTION

Field of the Invention

The invention relates to a system for avoiding collisions by and/or between aircraft and/or other vehicles.

Description of Prior Art

Every year thousands of aircraft are involved in ground mishaps, many of these mishaps involve damage to aircraft that originate from improper ground handling in and around hangars, other aircraft, or objects on the ground. Whenever this type of incident occurs it is known as "hangar rash". According to NBAA, hangar rash accounts for 50% of all aircraft ground handling damage reports annually and costs the general aviation industry nearly $3 Billion every year with each claim averaging around $124 thousand in repairs.

Hangar rash most commonly occurs during taxi or towing of aircraft in or around the hangar/flight line, because this is generally where most ground hazards are present and where it is most difficult for the operator to keep their eyes on the furthest outmost points on an aircraft. Multiple personnel are usually required to move aircraft in this hazardous area with the sole responsibility of keeping eyes on the outermost parts of the aircraft to ensure they do not come into contact with any obstacles. Whenever the aircraft comes into close contact with an obstacle it is the responsibility of the tow team to notify the tow driver/operator of the threat. However, not all MROs are equipped with enough personnel to watch every wingtip of an aircraft when moving airplanes, combine the lack of personnel with the fact that hangars will be packed to max capacity with aircraft and there become a lot of opportunities for hangar rash. Even with limited resources MROs are at an advantage over the single owner/operator who moves their privately owned aircraft in and around their small airfields and shared hangar space. Typically the single owner/operator is moving their airplane by themselves, and navigating through crowded hangars or flight lines. The opportunity for damage in these environments is nearly guaranteed.

Existing solutions include small tow tugs that are positioned relative to a front wheel of an aircraft to maneuver the aircraft in confined spaces. Two such tow tugs are the TOWBOT and the MOTOTOK.

Such tugs address concerns about starting, pulling, steering, hooking up, visibility and turn limits. Ideally, a tug eliminates lifting, positioning, electrical cords, fueling or hard starting of traditional aircraft towing machinery. Strengths of such systems include that they are remotely controlled; have tow capacities that start from 15 k lbs. up to 50 k lbs.; wirelessly operated; battery powered; 360° Turn capability. Weaknesses of such systems include cost, lack of any proximity sensors or warning system; large and heavy making it impractical to take with the aircraft.

Another existing solution called WINGGUARD utilizes sensors equipped with mmWave radar technology with customizable ranges up to 20 meters. Sensors are temporarily placed on each wing and, if desired, the back of the tug. A tug mounted hub receives the information from each sensor, including batter life, connectivity, as well as proximity to obstructions and displays the information onto the operator interface.

When one of the sensors comes in proximity of obstruction, an audible and visual cue will alert the tug operator allowing them to change course. If the aircraft comes within a dangerous range of an obstruction, the operator's interface will engage the emergency tug kill, successfully shutting off your tug's engine and avoiding the obstruction. This portable, wireless system is built for aircraft of all sizes, including commercial airliners, prop planes, and helicopters.

Strengths of this system include easy installation; temporary installation and thus no airworthiness is required; can be installed on any type of aircraft; wirelessly operated; battery powered; and integrated optional tug kill switch to prevent damage. Weaknesses include that the system is not installed on the aircraft, so protection does not go with the airplane; protection capability requires integration with a tug; too expensive for most private owner/operators; opportunity for a sensor to be accidentally left on a departing aircraft.

As such, there is an industry need for an affordable solution that is passive, portable and travels with the aircraft. A desirable system can provide warnings to a pilot and/or ground personnel about potential collisions thereby avoiding hanger rash.

SUMMARY OF THE INVENTION

The present invention provides cost-effective mmWave RF, or equivalent, sensors to provide 360° situational awareness during ground handling and is available no matter where the aircraft goes. By integrating proximity sensors into lighting assemblies, which normally are already installed at the outermost points of an aircraft, protection against hangar rash can be provided without the need to install additional equipment (either temporary or fixed) on the exterior of the airframe. The resulting system is an elegant, low cost solution to this problem.

The invention includes a collision avoidance system for aircraft or other vehicles. The system includes a plurality of ultrasonic sensors positioned around the aircraft and configured to be integrally fixed to the aircraft, and a warning indicator in combination with the sensors to alert when the aircraft approaches an obstacle. An electronic control unit, such as enclosed in a housing, desirably connects the plurality of ultrasonic sensors and the warning indicator.

The plurality of ultrasonic sensors are desirably integrated within the opposing wingtip lights and/or taillight fixture of the aircraft. In embodiments, the ultrasonic sensors comprise ultrasonic transducers. The ultrasonic sensors can have a 0.1 m to 20 m detection range, preferably with 1 cm resolution.

In embodiments, the warning indicator comprises an audio piezo module, preferably mounted in or under cowling, and/or a smart phone app wirelessly paired with the system, and/or a flashing mode for a taxi or other light. The warning indicator can additionally or alternatively be a wireless pairable device for a tow tug.

The system can be wired to or wirelessly connected to a cockpit control device, such as a cockpit switch. In embodiments, a three-position cockpit switch provides an enabled mode, a disabled mode, and a standby mode. The standby mode can be a passive mode powered by a battery independent of the aircraft operation, whereby the system operates even when the aircraft is non-operational.

In embodiments, the plurality of ultrasonic sensors detect a proximity of a landing strip during landing and ground obstacles during ground movement.

The invention further includes a collision avoidance system for aircraft embodied within a light fixture assembly includes a housing with a base and a clear dome over the base. The base including an aircraft attachment element that allows for drop-in replacement of original light housings. An aircraft light is within the housing, as well as an ultrasonic sensor. The sensor is tied to a warning indicator configured to issue an alert when the light fixture approaches an obstacle. The installation provides a permanent replacement for wing lights or taillights, whereby the proximity sensors are always on the aircraft, and do not need to be added once landed.

The aircraft light is selected from one or more of a navigation light, a position light, a taxi light, an anti-collision light, or a landing light. The light fixture is desirably a wingtip light or a taillight in several embodiments.

The system of this invention can also be connected to other aircraft sensors, such as engine or weather sensors.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
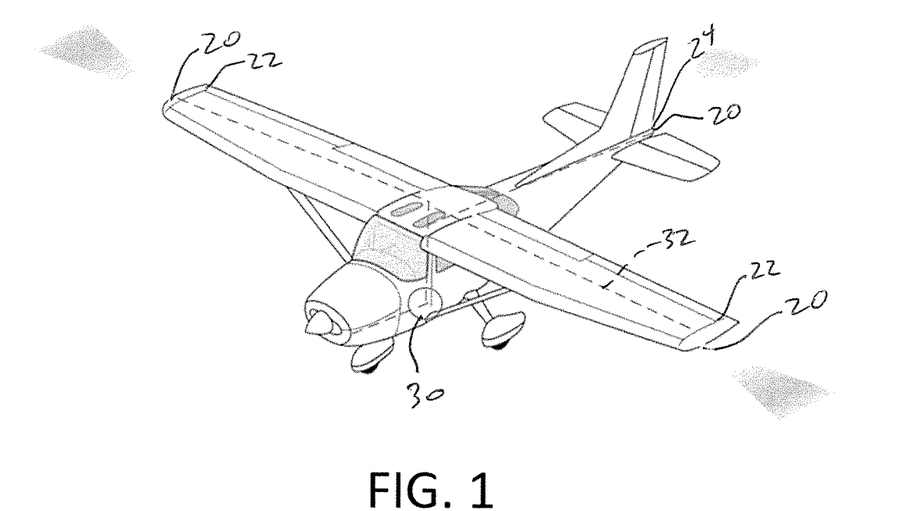
FIG. 1 shows a perspective view of a system according to a preferred embodiment of this invention.

FIG. 1 shows a schematic of a subject collision avoidance system. In a preferred embodiment ultrasonic sensors 20 are installed in the wingtips 22 and/or the tail 24 of the aircraft 26, as shown. The illustrated sensors 20 are adaptable for tail plus wingtip obstruction (or collision) avoidance warnings and will sound alerts in the cockpit, externally on the aircraft, to ground personnel, and/or to mobile devices. The sensors 20 are connected by communication bus system 32 to an electronic control unit (ECU) 30. The ECU 30 can be connected also to cockpit controls, as well as other sensors for the aircraft, such as engine sensors.

Preferably, the ultrasonic sensors are remote ultrasonic (above 50 KHz) transducers, utilizing time-of-flight algorithms. The sensors are preferably similar sensors to auto blind-spot detection systems adapted to aircraft use. Preferred sensors include a 0.1 m-20 m detection range with 1 cm resolution.

Figure 2:
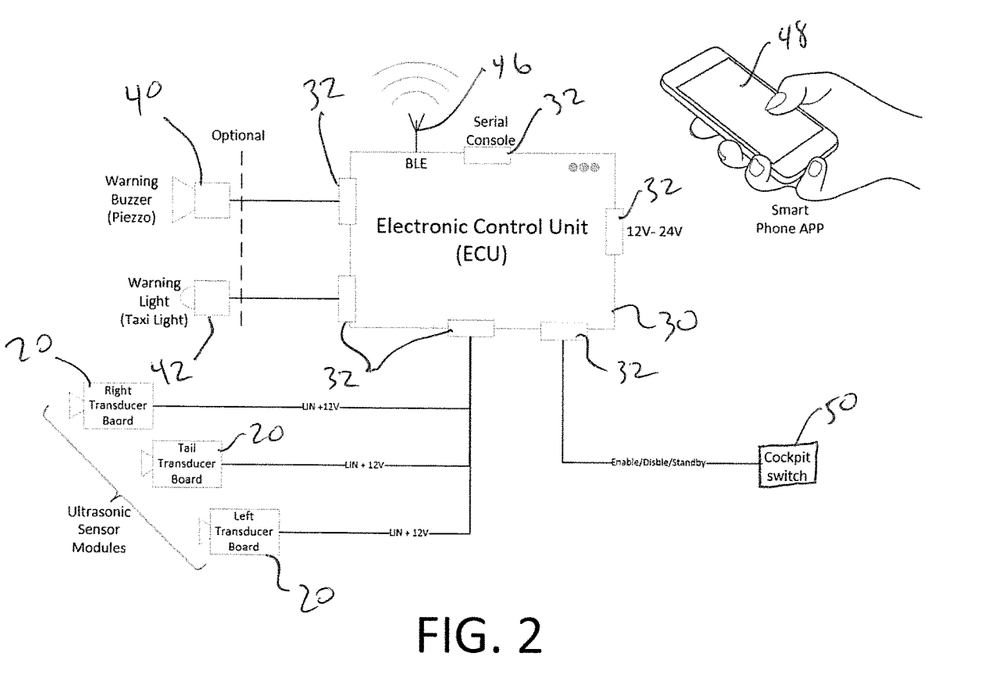
FIG. 2 shows a system block diagram according to a preferred embodiment of this invention.

FIG. 2 shows a system block diagram according to a preferred embodiment of this invention, such as for the implementation in FIG. 1. ECU 30 is connected to three sensor modules 20 (two wing, one tail). The ECU 30 desirably includes connector terminal, such as serial consoles 32, for efficient plug-in installation of the various components. The ECU 30 is connected to warning indicators 40 and 42. Active warning interfaces may include an audio (piezo) module 40 preferably mounted in or under an aircraft cowling and/or taxi or other light integration 42 (e.g., flashing). The ECU 30 further includes or connects to a Bluetooth antenna 46, for pairing to a smart phone app 48 or tow tug device. The ECU 30 further includes a connection to a cockpit switch 50. The system may include an Enable/Disable/Standby (3-position) switch, preferably within the cockpit but can be located as needed. In addition, the system may include a battery standby mode to allow the sensors to operate when the aircraft is powered off, thereby allowing the sensors to warn when another object is too close to the parked aircraft.

Figure 3A:
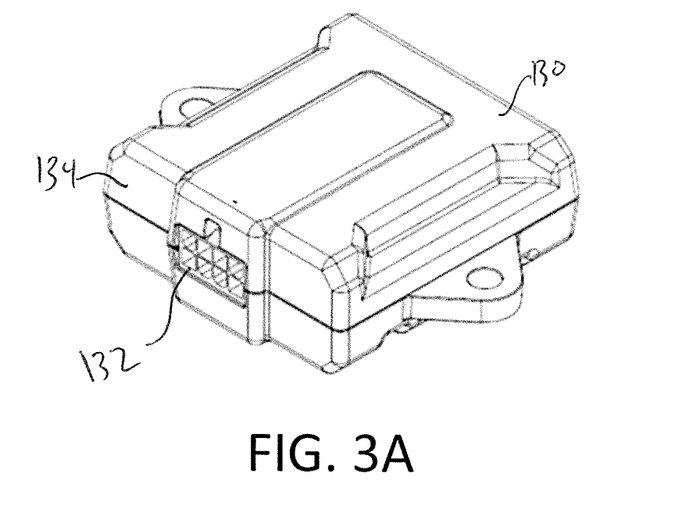
FIGS. 3A-3B show an electronic control unit according to a preferred embodiment of this invention.
Figure 3B:
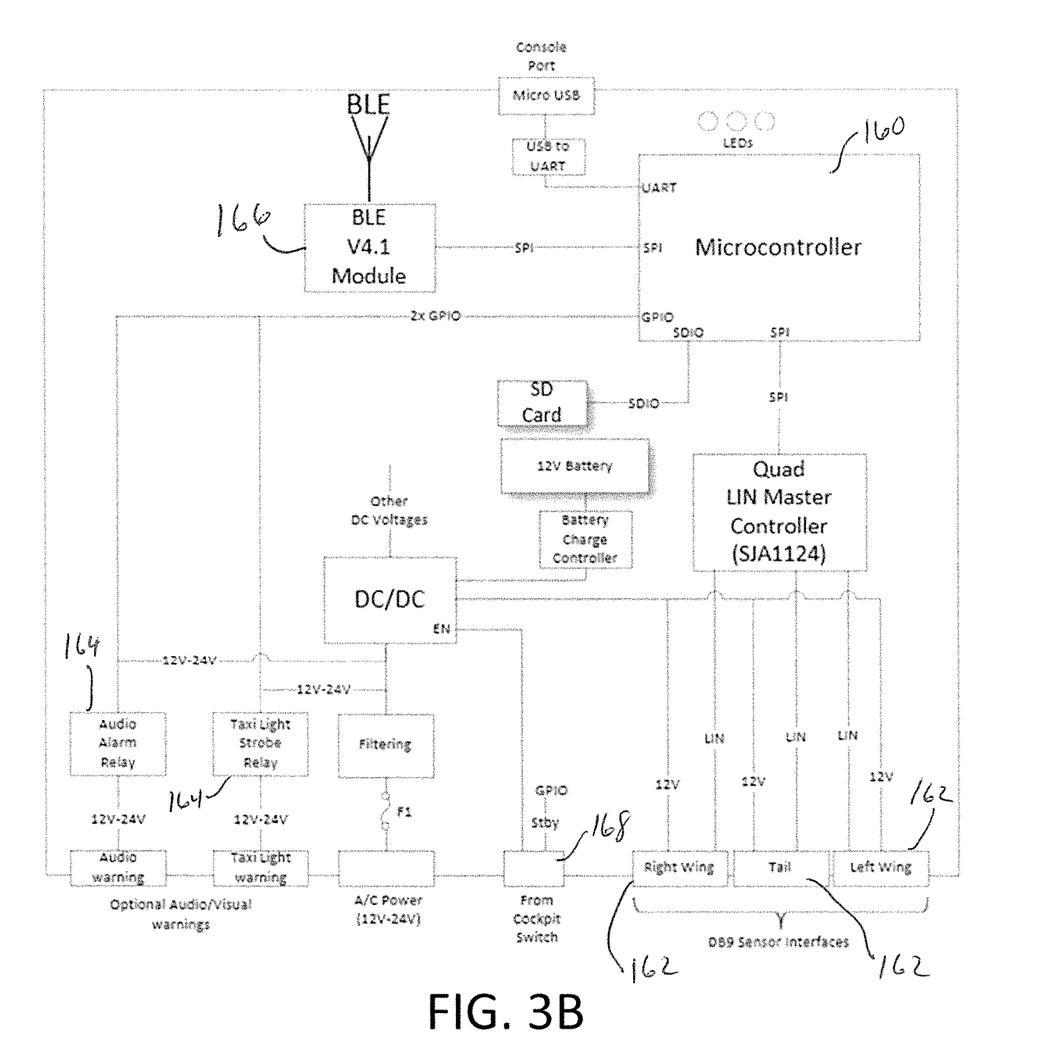

FIG. 3A shows an electronic control unit (ECU) 130 according to a preferred embodiment of this invention. The ECU 130 includes an outer housing 134 enclosing the operational circuitry, such as shown in FIG. 3B. The ECU 130 is preferably located within the host aircraft, and connectable to the system components by the housing serial connector consoles 132, such as shown in FIGS. 1 and 2. FIG. 3B schematically shows the ECU 130, according to one embodiment of this invention. A microcontroller 160 communicates with the sensors though sensor interfaces 162, and relays 164 for the warning indicators, as well as the Bluetooth module 166 and a cockpit switch interface 168.

Figure 4A:
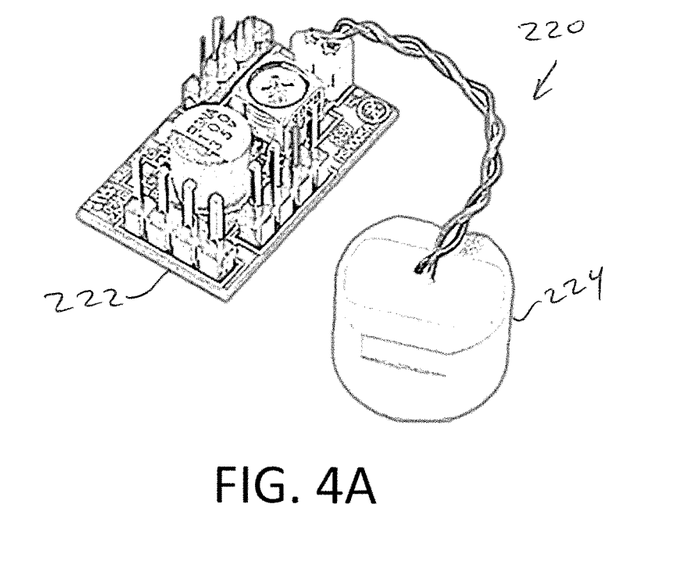
FIGS. 4A-4B show an ultrasonic sensing module according to a preferred embodiment of this invention.
Figure 4B:
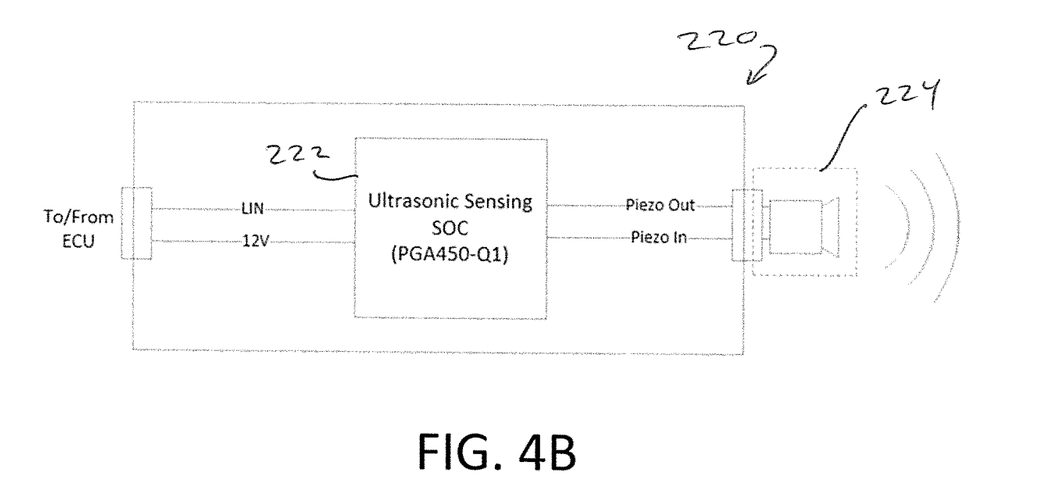

FIGS. 4A-4B show an ultrasonic sensing module 220 according to a preferred embodiment of this invention. The module 220 includes a 'system on a chip' (SoC) 222 connected to an ultrasonic transducer 224. One example of a suitable module is the Ultrasonic Sensor Signal Processor with Integrated Microcontroller, model number PGA450-Q1, available from Texas Instruments (Dallas, Texas). Multiple modules may be located on the aircraft to detect potential collisions with wings, tail and/or fuselage. The sensors are preferably enabled to sense proximity of ground obstacles, including other aircraft, during taxi and/or towing. The sensors preferably include wide enough range to provide protection for wing tips; wing leading edges; the top of the rudder; the rudder leading edge; and/or the tail section.

The subject system is additionally configurable by the user/owner and capable of owner configuration to modify: increase/decrease warning zone; audible tone; light flashing sequence; and/or direction of sensors.

Figure 5:
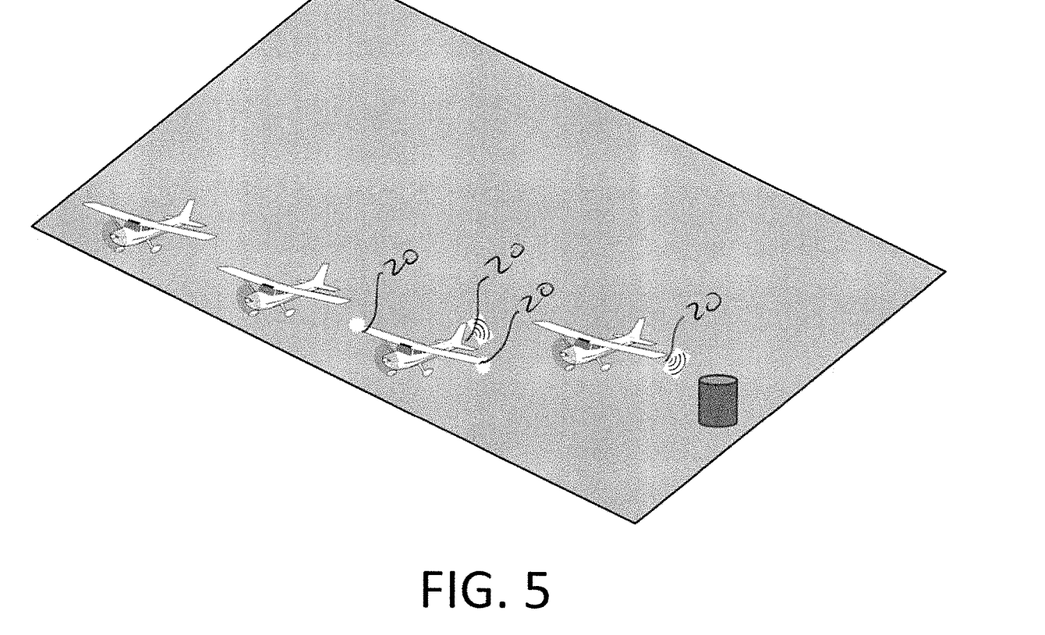
FIG. 5 shows a schematic view of a use case of the subject system according to a preferred embodiment of this invention.

FIG. 5 shows one use case of the subject system which is while the aircraft is taxiing. The subject system is capable of providing an audible warning during taxiing via a wireless or wired connection to a cabin speaker when proximity to a ground obstacle is detected within the warning zone. An example of the audible waring might be, "Warning: Ground Obstacle Detected, Left Wing Tip." An onboard power system enables an active state during ground operation.

Figure 6:
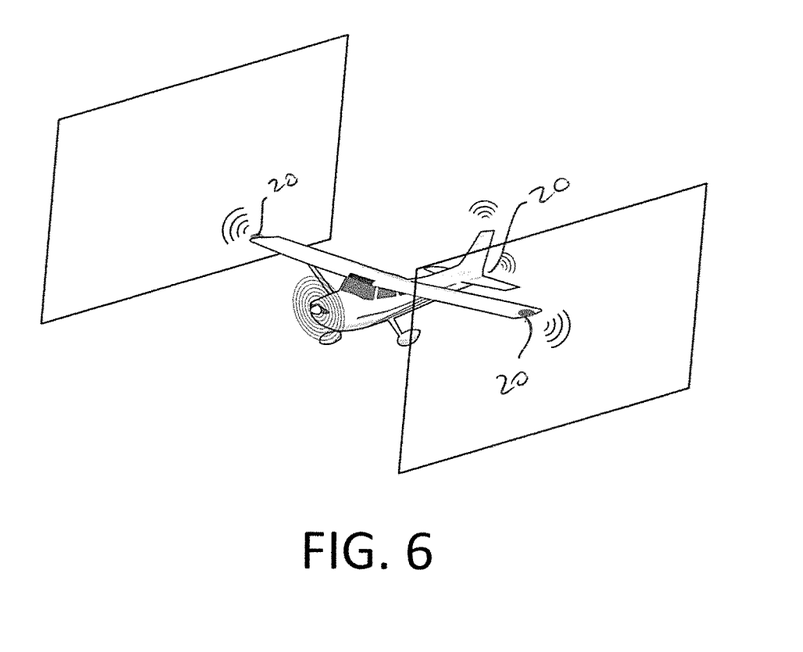
FIG. 6 shows a schematic view of a use case of the subject system according to a preferred embodiment of this invention.

FIG. 6 show another use case of the subject system during towing. During towing, a ground crew or the owner/operator can make use of the system's proximity detection through the use of a mobile app that provides visual and audible warnings to detected objects. In addition, visual warning can be provided by flashing the aircraft light where the risk is detected.

Figure 7:
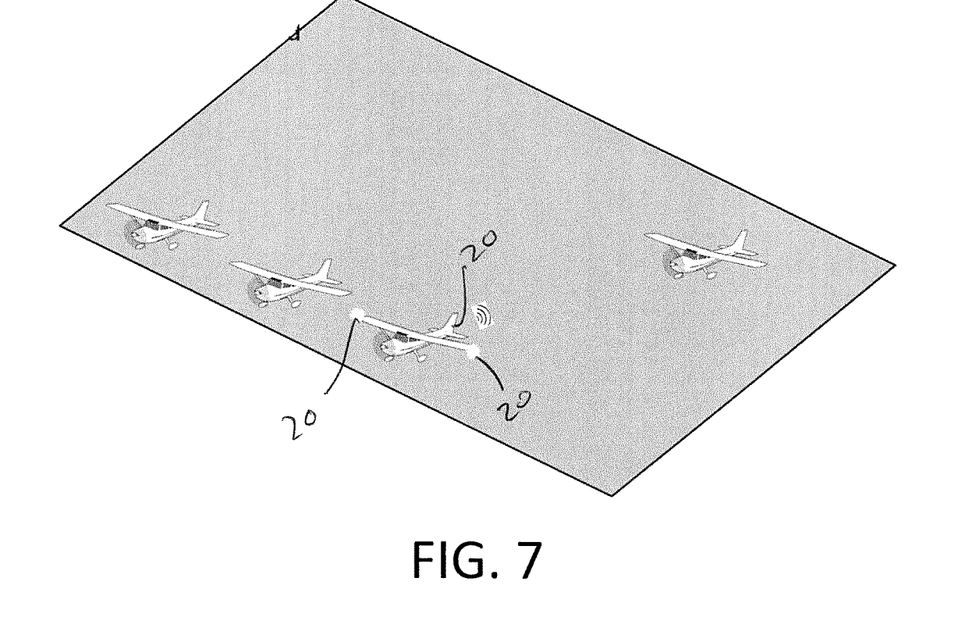
FIG. 7 shows a schematic view of a use case of the subject system according to a preferred embodiment of this invention.

FIG. 7 shows yet another use case of the subject system while parked. While parked, the system preferably operates in a passive state until another object such as another taxiing aircraft or ground vehicle is detected. Once detected it could provide a low light flashing indication to make the aircraft more visible to the incoming object.

Figure 8:
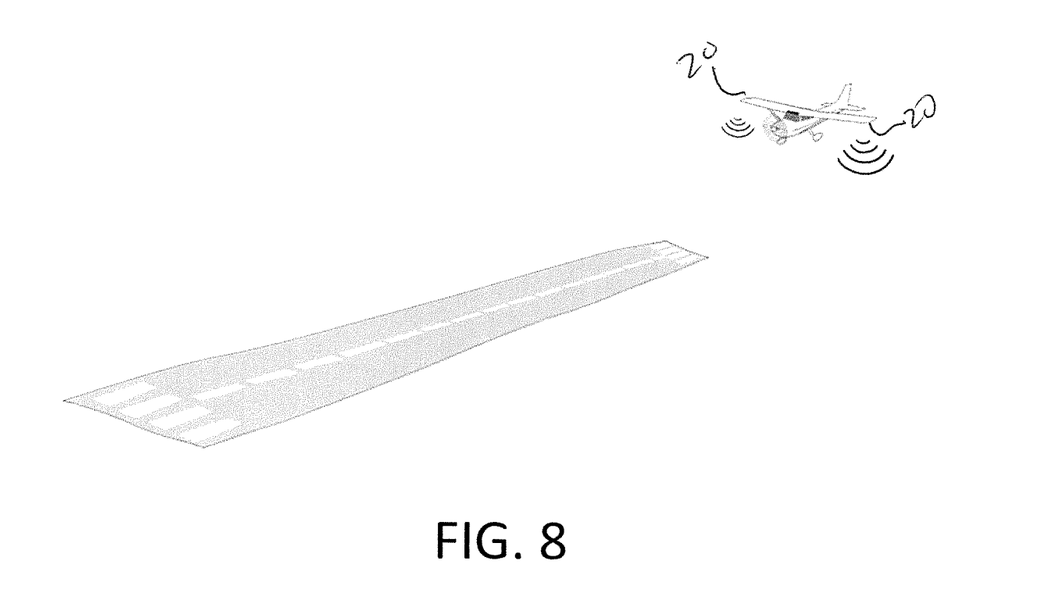
FIG. 8 shows a schematic view of a use case of the subject system according to a preferred embodiment of this invention.

FIG. 8 shows yet another use case of the subject system during landing. By integrating proximity sensors with a 100 m range, and then orienting them downwards, the capability of having an inexpensive radar altimeter becomes possible. While it is unlikely that this use would be certified for lower minimum approaches, it will still provide additional data to the pilot and enhance safety, especially when operating around unfamiliar airports.

Figure 9:
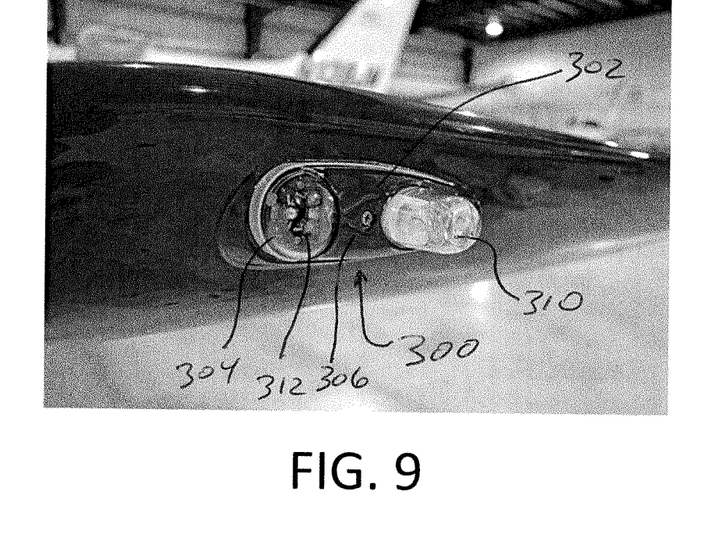
FIG. 9 shows a wing end installation site according to one embodiment of this invention.
Figure 10:
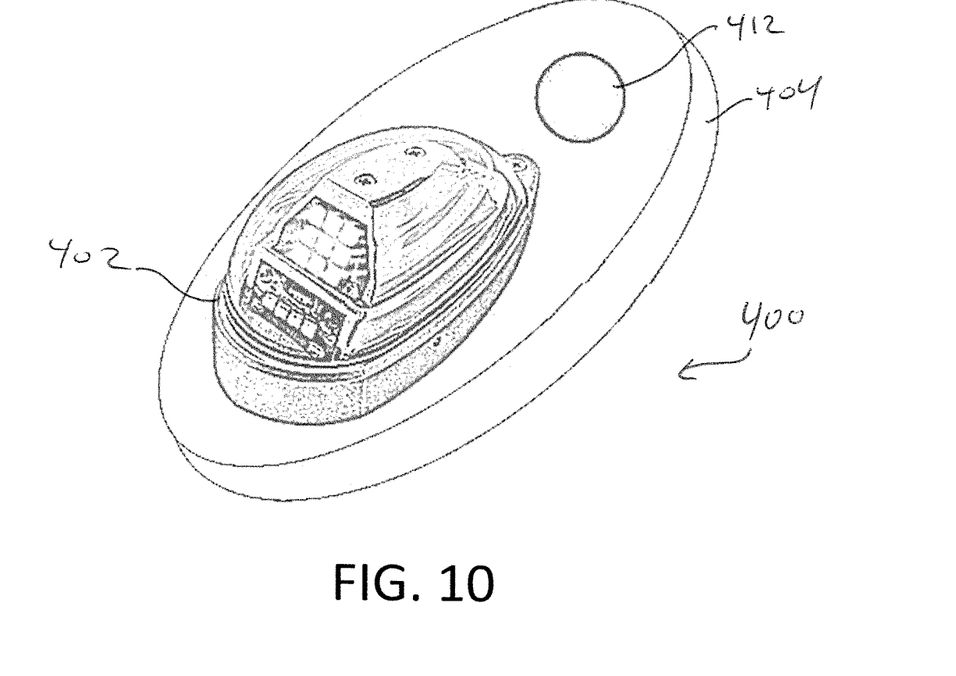
FIG. 10 shows a wing end system assembly according to one embodiment of this invention.
Figure 11:
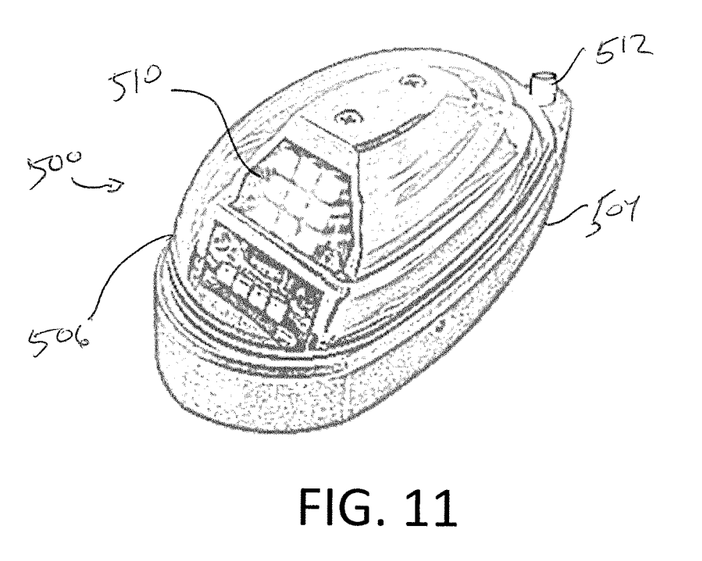
FIG. 11 shows a wing end system assembly site according to one embodiment of this invention.

The subject sensors are preferably integrated and/or integrateable with existing light assemblies, such as those shown in FIGS. 9-11. The integrated light assembly/proximity sensor is preferably a drop-in replacement for existing lighting assemblies without the need to add any additional wiring or structure. Adapters may be used where necessary to expand available market without the need of new product design. To facilitate use on aircraft the subject system is built to FAA TSO to minimize certification costs and/or be capable of installation using field approval processes.

Referring to FIG. 9, a light fixture assembly 300 includes a housing 302 with a base 304 and a clear dome 306 over the base 304. The base 304 includes suitable aircraft attachment elements, which correspond to the OEM attachments of the lighting assemblies for the aircraft. Within the domed housing 302 is an aircraft light 310, such as matching/replacing the original OEM light, and an ultrasonic sensor 312 according to this invention, such as described above.

FIG. 10 shows a light fixture assembly 400 that includes an adapter base 404 for an OEM light fixture 402. The adapter base 402 further includes a sensor 412. The adapter base with sensor allows the existing light fixture to be reused.

FIG. 11 shows a similar light fixture assembly 500 without the adapter, instead having the sensor 512 integrated with the base 504. The sensor 512 can also be integrated under the clear dome 506 with light 510 for further protection.

The subject system is preferably wireless capable and may include integrated wireless communication capability in either Bluetooth or WiFi for easy communication with mobile devices or other wireless devices.

The subject sensors preferably have a range of no less than 100 m. Sensors are accurate to within no less than 6 inches but ideally be accurate to within 1 inch. Sensors are active during ground operation through use of onboard aircraft battery supply. Sensors are preferably capable of being active during passive states through use of integrated battery for warning indications for other nearby moving aircraft or equipment.

The subject system thereby provides warnings of proximity to objects through audio and/or visual means. The system provides visual warning indications such as flashing lights with increased frequency for nearest proximity. A mobile app may also provide visual cues for proximity to object and warning indications. Audible warnings are provided through an integrated speaker and/or a mobile application with audible warning. The speaker may be a wireless speaker provided in cabin and/or on ground equipment. Audio panel integration may be an additional installation option.

As discussed above, the system, such as the ECU, can be integrated or otherwise combined with other potential bolt-on hardware and/or services. In one exemplary embodiment a real-time external weather sensor is tied to the system. This is a sensor that could be installed externally to the aircraft that would provide real time weather information at flight altitudes. When coupled with a wireless connection to a mobile application, Pilot reports (PIREPS) could be submitted automatically when certain conditions are observed. The data collected could also be licensed for use by other interested parties.

In aircraft that are not equipped with modern avionics systems, wireless engine sensors can be installed to track key operating information, such as run time, cycles, and flight hours. This data could then be used with the mobile application to assist operators in keeping track of their operational use of the aircraft and can provide notifications regarding required periodic maintenance and inspections. In addition to the data being tracked, automated delivery of required materials such as oil and oil filters could be automatically shipped to the user. As the maintenance actions are performed the app could be updated to keep track of the critical maintenance actions for proof of airworthiness. This application could also provide a single source for maintaining all other documentation required for flight, such as digital copies of pilot's certificates and medicals.

Lastly, the subject system may be adaptable to other vehicles and industries including nautical, trucking, shipping, warehouse, and others.

While in the foregoing specification this invention has been described in relation to certain preferred embodiments thereof, and many details have been set forth for purpose of illustration, it will be apparent to those skilled in the art that the device and placard are susceptible to additional embodiments and that certain of the details described herein can be varied considerably without departing from the basic principles of the invention.

The invention claimed is:

1. A collision avoidance system for aircraft comprising:
a plurality of ultrasonic sensors positioned around the aircraft and configured to be integrally fixed to the aircraft, wherein each of the plurality of ultrasonic sensors is integrated within a corresponding wingtip light or taillight fixture of the aircraft;
a three-position cockpit switch, comprising an enabled mode, a disabled mode, and a standby mode;
a warning indicator when the aircraft approaches an obstacle; and
an electronic control unit connected to the plurality of ultrasonic sensors, the three-position cockpit switch, and the warning indicator, the electronic control unit including an antenna configured for wireless connectivity of the electronic control unit to a mobile device; and
a mobile device app for the mobile device;
wherein the collision avoidance system operates in a towing mode adapted to provide warnings of detected objects via the mobile application operated by a ground crew, and the electronic control unit, the plurality of ultrasonic sensors, and the warning indicator operates in the standby mode when the aircraft is powered off, thereby allowing the plurality of ultrasonic sensors to warn when another object is close to the aircraft when the aircraft is parked.

2. The collision avoidance system of claim 1, wherein the ultrasonic sensors comprise ultrasonic transducers.

3. The collision avoidance system of claim 1, wherein the ultrasonic sensors comprise a 0.1 m to 20 m detection range, with 1 cm resolution.

4. The collision avoidance system of claim 1, wherein the warning indicator comprises an audio piezo module.

5. The collision avoidance system of claim 1, wherein the mobile device application comprises a smart phone app wirelessly paired with the system, wherein the smart phone app provides a visual warning indication and an audible warning indication.

6. The collision avoidance system of claim 1, wherein the warning indicator comprises a flashing mode for a taxi light.

7. The collision avoidance system of claim 1, wherein the plurality of ultrasonic sensors detect a proximity of a landing strip during landing and ground obstacles during ground movement.

8. The collision avoidance system of claim 1, further comprising a secondary battery power supply configured to power the system in the standby mode when the aircraft is not operating.

9. The collision avoidance system of claim 1, wherein the plurality of ultrasonic sensors include a downward directed sensor and the collision avoidance system operates in a landing mode adapted to provides warning indications of a landing strip.

10. The collision avoidance system of claim 1, further comprising an adapter base, wherein the adapter base includes at least one of the plurality of ultrasonic sensors and is configured to attach between a light fixture and a wing or tail of the aircraft.

11. A collision avoidance system for aircraft comprising:
a light fixture assembly comprising a housing including a base and a clear dome over the base, the base including an aircraft attachment element;
an aircraft light within the housing,
an ultrasonic sensor within the housing;
a three-position cockpit switch connected to the electronic control unit, the cockpit switch comprising an enabled mode, a disabled mode, and a standby mode;
a warning indicator in combination with the ultrasonic sensor, and configured to issue an alert when the light fixture approaches an obstacle;
an electronic control unit wired or wirelessly connected to the ultrasonic sensor and the warning indicator the three-position cockpit switch, and the warning indicator, the electronic control unit including an antenna configured for wireless connectivity of the electronic control unit to a mobile device; and
a mobile device application for the mobile device;
wherein the collision avoidance system operates in a towing mode adapted to provide a warning of a detected objects via the mobile application operated by a ground crew, and the electronic control unit, the ultrasonic sensor, and the warning indicator operates in the standby mode when the aircraft is powered off, thereby allowing the ultrasonic sensor to warn when another object is close to the aircraft when the aircraft is parked.

12. The collision avoidance system of claim 11, wherein the aircraft light is selected from a navigation light, a position light, a taxi light, an anti-collision light, or a landing light.

13. The collision avoidance system of claim 11, wherein the light fixture assembly is a drop-in replacement for an original equipment light assembly.

14. The collision avoidance system of claim 11, wherein the light fixture is a wingtip light or a taillight.

15. The collision avoidance system of claim 11, further comprising a secondary battery power supply configured to power the system in a passive operation state when the aircraft is not operating.

16. The collision avoidance system of claim 11, further comprising engine sensors connected to the electronic control unit.

17. The collision avoidance system of claim 11, wherein the warning indicator comprises at least two of: an audio piezo module mounted in the aircraft cowling, a smart phone app wirelessly paired with the system, and a flashing taxi light.

* * * * *